United States Patent [19]
Hoff

[11] 3,936,215
[45] Feb. 3, 1976

[54] TURBINE VANE COOLING

[75] Inventor: Richard W. Hoff, Newington, Conn.

[73] Assignee: United Technologies Corporation, Hartford, Conn.

[22] Filed: Dec. 20, 1974

[21] Appl. No.: 534,620

[52] U.S. Cl. .............. 415/11.5; 415/178; 415/116
[51] Int. Cl.² ......................................... F01D 5/00
[58] Field of Search ................... 415/115, 116, 178

[56] References Cited
UNITED STATES PATENTS

| | | | |
|---|---|---|---|
| 3,663,118 | 5/1972 | Johnson | 415/116 |
| 3,768,921 | 10/1973 | Brown et al. | 415/116 |

*Primary Examiner*—Henry F. Raduazo
*Attorney, Agent, or Firm*—Robert C. Walker

[57] ABSTRACT

A method and apparatus for providing high pressure cooling air to the turbine vanes of a gas turbine engine is disclosed. A centrifugal compressor stage is interposed in the flow path of cooling air to the turbine vanes. The centrifugal compressor stage raises the pressure of the cooling air to a value substantially greater than the pressure of the combustion gases entering the turbine. The availability of high pressure cooling air allows the incorporation of improved cooling systems in the turbine vanes. Increasingly effective cooling systems are necessary to the continued development of low pressure drop combustion chambers which discharge high temperature gases to the inlet of the turbine.

8 Claims, 2 Drawing Figures

3,936,215

TURBINE VANE COOLING

The invention herein described was made in the course of or under a contract with the Department of the Air Force.

BACKGROUND OF THE INVENTION

1. Field of the Invention

This invention relates to gas turbine engines and more particularly to the cooling of turbine components in engines having high turbine inlet temperatures.

2. Description of the Prior Art

A gas turbine engine principally includes a compressor section, a combustion section and a turbine section. Each of the sections is individually designed, where possible, to maximize local efficiencies and improve the associated overall performance of the engine. Care must be exercised, however, to ensure that local efficiency improvements do not disturb the operating compatibility between the various engine components of the principal sections.

The combustion section is positioned immediately downstream of the compressor section and receives high pressure gases which comprise the engine working medium discharged from the compressor. A portion of the working medium gases is mixed with fuel in a combustion chamber to form a combustible mixture which is burned to increase the kinetic energy of the flowing gases. To decrease the amount of unburned hydrocarbons which are discharged from the combustion chamber and to improve chamber performance, it is desired to burn the combustible mixture at high temperatures. Additional combustion chamber performance increases are achieved by minimizing the pressure loss of the working medium as the medium flows through the combustion section. It is, therefore, well known in the art that a combustion chamber having maximum temperatures and minimum flow losses offers the highest local benefits.

From the combustion section the working medium is flowed to the turbine where an annular nozzle comprising a plurality of turbine vanes directs the working medium gases, which include the hot combustion gases produced in the upstream chamber, at a preferred angle into a row of downstream turbine blades. The blades receive the working medium and extract kinetic energy from the medium to drive the compressor and engine accessories. Although the blades and vanes are fabricated from the finest high temperature materials in order to survive the hostile environment of the combustion gases, the local temperatures of the combustion gases still exceed the maximum acceptable temperatures for all known suitable blade and vane materials.

It is widely known that blade and vane temperatures can be held within safe limits by flowing cooling air over the internal and external surfaces of the airfoil sections. Compressor exit air is the most highly pressurized air available within the engine and is utilized for cooling. In one typical embodiment cooling air is flowed from a port at the inner diameter of the compressor gas path through various conduit means to the turbine section of the engine. The pressure of the cooling air which flows to the turbine is reduced by flow losses through the conduit means and is typically at a value of 95% to 96% of the compressor exit pressure by the time the cooling air reaches the airfoil section. As long as the pressure loss of the working medium flowing through the combustion section is higher than the pressure loss of the cooling air through the various conduit means, a positive flow of cooling air through the blades and vanes is maintained.

As has been discussed above, minimization of the combustion section pressure loss is one of the design goals toward achieving optimum overall engine performance. Although current commercial engines exhaust combustion gases to the turbine at approximately 94% of the compressor exit pressure, modern combustion chambers exhausting gases at approximately 96% of the compressor exit pressure have been designed. The minimized pressure loss combustor, while remaining highly desirable, is somewhat limited in utility by the downstream components of the turbine which require a positive flow of cooling air. U.S. Pat. No. 3,628,880 to Smuland shows a turbine vane having intricate cooling systems to effect acceptable vane cooling in the destructive turbine environment of an engine having high turbine inlet temperatures. Various combinations of impingement, convective and film cooling maintain the metal temperature at or below acceptable levels as long as an adequate supply of cooling air is provided. Impingement cooling which is provided at the interior walls of the Smuland airfoil, requires a high pressure differential between the cooling air and the turbine working medium and is especially sensitive to reduced cooling air pressure. In normal operation cooling air is accelerated through small diameter holes in a baffle insert to a velocity at which air impinges on the interior walls of the airfoil. If the pressure drop across the baffle is not high enough low velocity flow occurs and impingement cooling is not accomplished. In a typical modern engine the pressure drop across the leading edge of the foil is within a range of three to six psi at take-off, and somewhat lower at altitude conditions. Inasmuch as pressure drops substantially greater than that are required for impingement cooling, the cooling flow is exhausted to a lower pressure along the suction side of the airfoil section rather than to the leading edge. It is known in the art that film cooling of the leading edge offers an attractive and efficient means for cooling the leading edge. In current engines the capacity for film cooling in conjunction with impingement cooling at the leading edge is severely limited by the inability to exhaust impingement cooling flow at the leading edge of the airfoil as described above.

Continuing efforts are underway to maximize the pressure of the cooling air in the vane region in order to ensure an adequate pressure differential between the cooling air and the working medium gases to which the cooling air is exhausted. Improved turbine cooling is of increased importance as efficiently operating low pressure drop combustion chambers become available.

SUMMARY OF THE INVENTION

A primary object of the present invention is to improve the overall system efficiency of a gas turbine engine and to improve the structural integrity of cooled turbine components. An additional object of the present invention is to permit the incorporation of effectively cooled turbine vanes which are compatible with the low pressure drop combustion chambers of modern gas turbine engines. Concomitantly, one specific object is to raise the pressure of the turbine vane cooling air to a level substantially higher than the pressure of the working medium gases at the inlet to the turbine.

In accordance with the present invention an auxilliary compression means is disposed within the path of cooling air flowing to the turbine of a gas turbine engine. A small portion of the air which is compressed in the compressor section of the engine is bled from the compressor gas path and is flowed axially rearward to the auxilliary compression means; the cooling air is pumped through said compression means to internal passages in a row of hollow vanes at the inlet to the turbine.

A primary feature of the present invention is the impellor of the centrifugal compressor stage which raises the pressure of the turbine cooling air to a value substantially in excess of the pressure of the working medium gases at the inlet to the turbine. Another feature of the present invention is the plurality of air supply nozzles which, in one embodiment, accelerate the flow of air to the centrifugal compressor stage to a velocity which is approximately equal to the tangential velocity of the impellor at the inlet region to the centrifugal stage. Flow straightening vanes are positioned between the impellor and the row of turbine vanes to recover the velocity pressure head of the cooling air which is discharged from the impellor at the exit region of the centrifugal stage.

A principal advantage of the present invention is the compatibility of turbine cooling systems incorporating the hereafter described apparatus with modern combustion chambers which produce reduced flow losses in the working medium. Highly effective combinations of impingement, convective and film cooling of the turbine vanes are advantageously employed through the use of the higher pressure cooling air. Effective cooling enhances the resistance of vane materials to the destructive attack of combustion gases and prolongs the attendant service life of the cooled components.

The foregoing, and other objects, features and advantages of the present invention will become more apparent in the light of the following detailed description of the preferred embodiment thereof as illustrated in the accompanying drawing.

DETAILED DESCRIPTION OF THE PREFERRED EMBODIMENT

Figure 1:
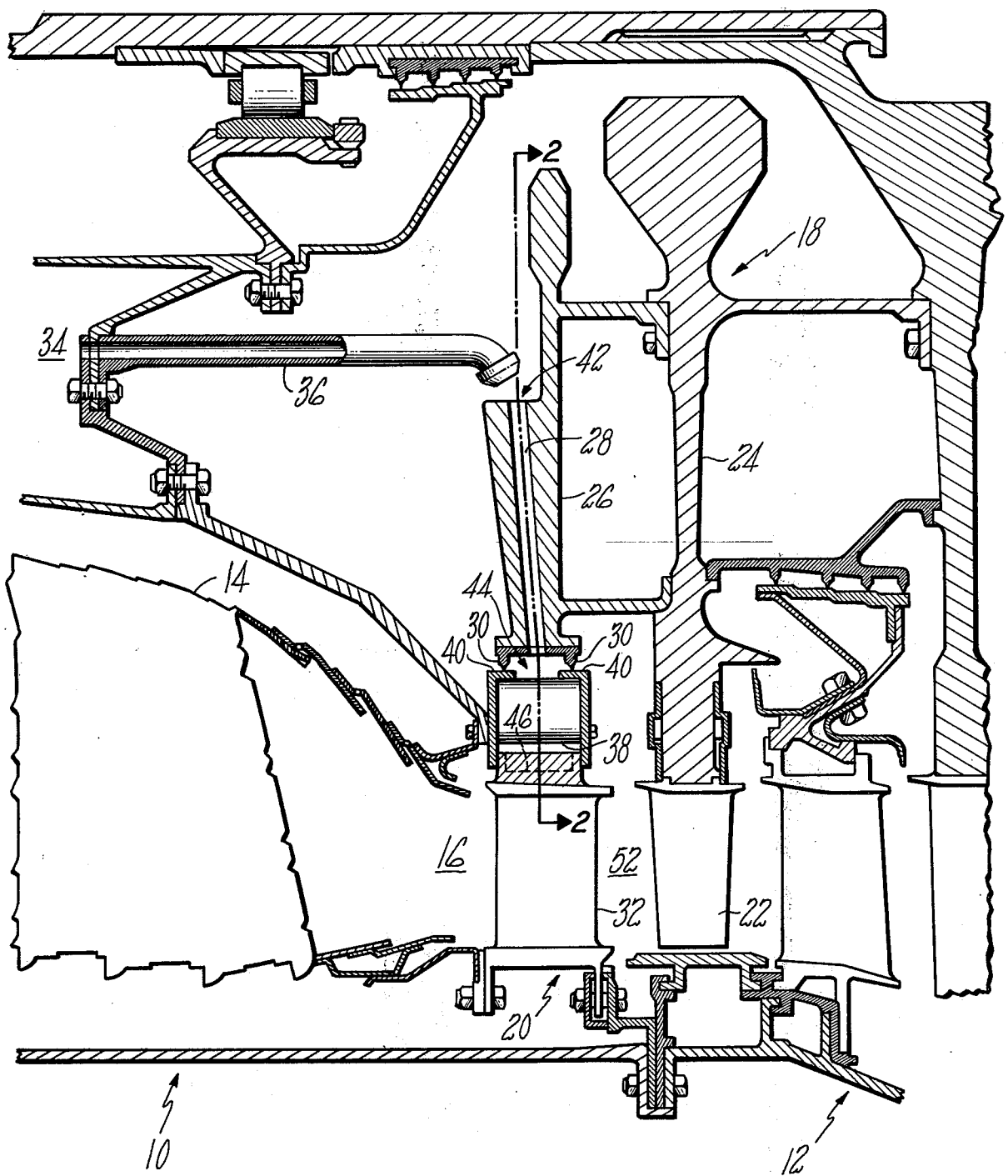
FIG. 1 is a partial cross-sectional view of a gas turbine engine showing portions of the combustion and turbine sections.

A portion of the combustion section 10 and a portion of the turbine section 12 of a gas turbine engine are shown in cross section in FIG. 1. A combustion chamber 14 having an annular exit region 16 is located within the combustion section. The turbine section 12 is located immediately downstream of of the combustion section 10 and principally comprises a rotor assembly 18 and a stator assembly 20. The rotor assembly of the turbine section includes a blade 22 which is mounted at one point on the periphery of a disk 24. A multiplicity of blades is mounted at additional points on the periphery of the disk to form a circumferentially disposed row of blades. A centrifugal compressor stage 26 is located axially forward of the blades 22 and is attached to the disk 24. The compressor stage 26 has an impellor 28 and a pair of axial seals 30 extending radially from the periphery of the stage.

The stator assembly of the turbine section includes a turbine vane 32 which is positioned immediately downstream of the annular exit region 16 of the combustion chamber 14. A multiplicity of turbine vanes is disposed circumferentially about the annular exit region at the same axial location to form a turbine nozzle. A conduit means 34 for carrying cooling air to the turbine section is positioned radially inward of the combustion chamber 14. A cooling air supply nozzle 36 extends from the conduit means 34 to the vicinity of the centrifugal compressor stage 26 of the rotor assembly. A flow straightening vane 38 is positioned radially inward of the turbine vane 32. A multiplicity of flow straightening vanes is circumferentially disposed at the same axial engine position. A pair of seal lands 40 which oppose the pair of axial seals 30 of the rotor assembly are positioned radially inward of the flow straightening vanes 38.

Figure 2:
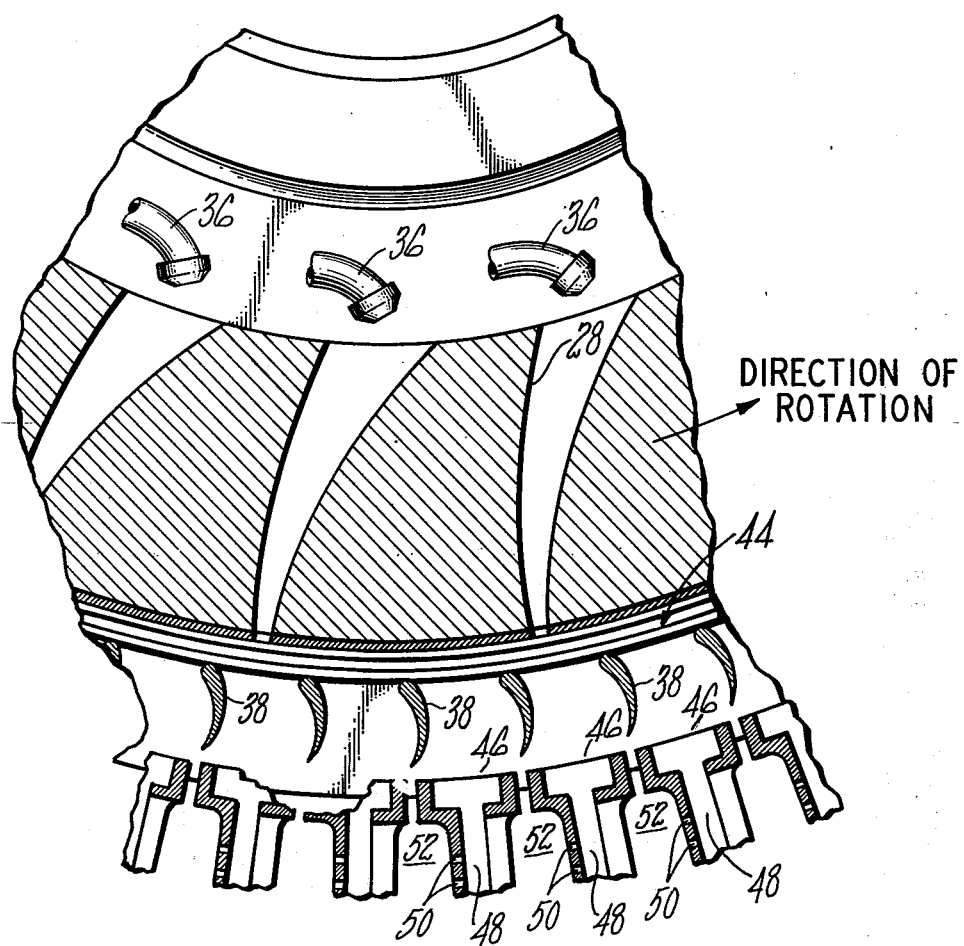
FIG. 2 is a cross sectional view taken along the line 2—2 as shown in FIG. 1.

During operation of the engine, cooling air is flowed through the conduit means 34 to the supply nozzles 36 which discharge the cooling air to a flow inlet region 42 which is adjacent to the centrifugal compressor stage. As is shown in FIG. 2, the cooling air is pumped radially within the centrifugal stage by the impellor 28 to a flow exit region 44 which is axially bounded by the pair of seals 30 in cooperation with the seal lands 40 of the stator assembly shown in FIG. 1. The cooling air discharged from the impellor has a tangential velocity in the direction of rotation of the centrifugal compressor stage 26. The flow straightening vanes 38 turn the tangentially flowing air so that flow through a straightening vane exit region 46 is essentially radial. Flow from the straightening vane exit region 46 enters hollow portions 48 in the vanes 32, cools the vanes and is subsequently discharged through holes 50 to a working medium flow path 52 through the turbine section.

The pressure of the working medium gases flowing through a gas turbine engine is the highest at the exit to the compressor. As the working medium gases flow downstream from the compressor through the combustion section, the pressure of the medium gases diminishes to approximately 94% of the compressor exit value. Concurrently, the combustion process radically increases the maximum temperature of local gases by more than two thousand degrees to approximately 3200°F at the inlet to the turbine. The maximum temperature of the local gases exceeds the temperature limit of all known suitable blade and vane materials and turbine cooling is required.

The only air which is available at sufficiently high pressures for turbine cooling within conventional engines is compressor exit air. Accordingly, in conventional constructions, compressor exit air is flowed from the compressor through various conduit means to the turbine. Flow losses through the conduit means reduce the cooling air pressure to approximately 95% to 96% of the compressor exit value. A pressure differential of one to two percent between the cooling air and the hot working medium gases at the leading edge of a first turbine vane provides a maximum pressure drop of between three and six pounds per square inch which occurs under the take-off condition. This differential is sufficient to flow film cooling air from the leading edge of the airfoil, but it is not sufficient to impingement cool in the region as well. Impingement and film cooling can only be combined where the medium to which the impingement flow is exhausted is substantially less than cooling air supply pressure. Accordingly, impingement flow in conventional engines must be exhausted at the suction side of the airfoil rather than at the leading edge.

The centrifugal compressor stage 26 of the present invention is interposed in the flow path of cooling air to the turbine and raises the pressure of the vane cooling air to approximately one hundred twenty percent of the compressor exit value. The increased differential across the vane leading edge allows various combinations of impingement, convection and film cooling to be utilized at the vane leading edge. Although compressor exit air is utilized in this preferred embodiment, it should be apparent that air from intermediate compressor stages may alternatively be utilized depending upon the cooling air pressure required at the vane leading edge.

The apparatus of the present invention has important utility when used in conjunction with modern combustion chambers of the premix and swirl combustion types which impart reduced flow losses to the medium gases flowing therethrough. Combustion chambers employing modern burning techniques reduce the working medium pressures to approximately 96% of their compressor exit value. Inasmuch as the pressure of cooling air available in the conduit means 34 and the working medium pressure at the vane leading edge are approximately equal, film cooling air can only be flowed to the exterior surface of the vane at the leading edge when apparatus similar to that described in this preferred embodiment is incorporated in the engine to substantially raise the pressure of the available cooling air.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of our invention, that which we claim as new and desire to secure by Letters Patent of the United States is:

1. In a gas turbine engine of the type having coolable turbine stator vanes and containing apparatus including conduit means leading from the compressor flow path for supplying cooling air to the coolable stator vanes, the improvement comprising:
   compression means disposed between the conduit means and the coolable vane for raising the pressure of the cooling air to a value in excess of the pressure of the air within the compressor flow path; and
   fixed flow straightening means operatively disposed between said compression means and the coolable vanes to recover the velocity pressure head of the cooling air which is discharged from said compression means.

2. The invention according to claim one wherein said compression means is a centrifugal compressor stage having an inlet region and an exit region.

3. The invention according to claim two wherein said fixed flow straightening means includes a plurality of vanes disposed between the centrifugal compressor stage and the coolable vanes and wherein the vanes deflect the air flowing therethrough to an essentially radial direction.

4. The invention according to claim three which further includes at least one air supply nozzle disposed between the conduit means and the centrifugal compressor stage for directing the air flowing therethrough to said centrifugal compressor stage.

5. The invention according to claim two which further includes a pair of axial seals which are radially positioned between the centrifugal compressor stage and the stator coolable vanes, one seal located axially forward of the stage exit region and the other seal located axially rearward of the stage exit region.

6. In a gas turbine engine having a rotor assembly including a plurality of turbine blades and a stationary stator assembly including a plurality of turbine vanes, apparatus for supplying cooling air to the vanes of the stator assembly comprising:
   a centrifugal compressor stage including an impellor having an inlet region and an exit region which is disposed axially forward of the turbine blades, the impeller being radially enclosed by the stationary structure of the stator assembly;
   a pair of axial seals radially positioned between the impeller and the stationary structure of the stator assembly, one seal located axially forward of the impeller exit region and the other seal located axially rearward of the impeller exit region;
   a plurality of flow straightening vanes attached to the stationary structure of the stator assembly at a radial position between the impeller exit region and the vanes of the stator assembly for imparting an essentially radial direction to the cooling air discharged from the impeller; and
   means for supplying air to the impeller inlet of the centrifugal compressor stage.

7. The invention according to claim six wherein the means for supplying air to the impeller inlet of the centrifugal compressor stage includes:
   a plurality of cooling air supply nozzles for supplying air to the impeller inlet and which is adapted to discharge the cooling air at the tangential velocity which is substantially equal to the tangential velocity of the impeller at the inlet; and
   conduit means for flowing cooling air from the compressor of the gas turbine engine to the air supply nozzles.

8. In a gas turbine engine, a method for providing cooling air to the turbine stator vanes at a pressure which is substantially higher than the maximum pressure of the working medium flowing through the engine, comprising the steps of:
   bleeding a portion of the working medium from the compressor flow path for cooling the turbine stator vanes;
   flowing said portion of the working medium through conduit means to the turbine section of the engine;
   compressing further said portion of the working medium to a pressure which is higher than the maximum pressure of the working medium flowing through the engine;
   flowing said further compressed portion of the working medium through fixed flow straightening means to recover the velocity pressure head of the medium; and
   flowing said further compressed portion of the working medium to the turbine stator vanes to cooling the vanes.

* * * * *